United States Patent
Stein et al.

(10) Patent No.: US 7,169,339 B2
(45) Date of Patent: Jan. 30, 2007

(54) METHOD FOR PRODUCING POLYMETHACRYLIMIDE FOAMS

(75) Inventors: Peter Stein, Traisa (DE); Hermann Seibert, Kaiserslautern (DE); Leonard Maier, Rodgau (DE); Rainer Zimmermann, Seeheim-Jugenheim (DE); Wilfried Heberer, Reichelsheim (DE); Werner Geyer, Muehltal (DE)

(73) Assignee: Roehm GmbH & Co. KG, Darmstadt (DE)

(*) Notice: Subject to any disclaimer, the term of this patent is extended or adjusted under 35 U.S.C. 154(b) by 284 days.

(21) Appl. No.: 10/486,361

(22) PCT Filed: Aug. 1, 2002

(86) PCT No.: PCT/EP02/08569

§ 371 (c)(1),
(2), (4) Date: Mar. 1, 2004

(87) PCT Pub. No.: WO03/020804

PCT Pub. Date: Mar. 13, 2003

(65) Prior Publication Data

US 2004/0235973 A1    Nov. 25, 2004

(30) Foreign Application Priority Data

Aug. 29, 2001  (DE)  ................................ 101 41 757

(51) Int. Cl.
*B29C 44/02* (2006.01)
*C08J 9/00* (2006.01)

(52) U.S. Cl. .................... 264/51; 521/94; 521/117; 521/183

(58) Field of Classification Search .................. 264/51, 264/53, 54; 521/53, 94, 117, 183
See application file for complete search history.

(56) References Cited

U.S. PATENT DOCUMENTS 3,593,848 A * 7/1971 Landau ......................... 428/98
3,812,225 A * 5/1974 Hosoda et al. ................. 264/54
6,670,405 B1 * 12/2003 Servaty et al. ................. 521/53

FOREIGN PATENT DOCUMENTS

DE  36 30 930    3/1988
WO  00 63280    10/2000

OTHER PUBLICATIONS

Patent Abstracts of Japan vol. 016, No. 212 (M-1250), May 19, 1992 & JP 04 037529 A (Sekisui Chem Co Ltd), Feb. 7, 1992 abstract.

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

The invention relates to an improved method for producing foamed material, especially poly(meth)acrylimide foams, which are foamed from polymer plates produced according to the casting method. The two-step method consists of a pre-heating step and at least one foaming step. The product obtained has a significantly smaller compressive strain, measured according to DIN 53425(ASMD 621), than prior art products.

14 Claims, 1 Drawing Sheet

1) Preheating time
2) Foaming time with preheating
3) Foaming time without preheating 1) Preheating time
2) Foaming time with preheating
3) Foaming time without preheating

METHOD FOR PRODUCING POLYMETHACRYLIMIDE FOAMS

FIELD OF THE INVENTION

The invention relates to an improved method for the preparation of foams, in particular poly(meth)-acrylimide foams, which are foamed from polymer sheets produced by the casting method. The two-stage method consists of a preheating step and one or more foaming steps.

DISCUSSION OF BACKGROUND

Polymethacrylimide foams have long been known and, owing to their excellent mechanical properties and their low weight, are widely used, in particular in the production of multilayer materials, laminates, composites or foamed composites. Prepregs comprising polymethacrylimide core materials are frequently bonded here.

For example, they are used in aircraft construction, in shipbuilding as well as in automotive construction. For many of these numerous applications, they have to meet technical requirements laid down in statutory provisions and a number of other regulations.

The present invention relates to the area of the polymer blocks produced by the casting method and polymethacrylimide foams prepared therefrom. Here, the monomers methacrylic acid and methacrylonitrile are introduced between two plane-parallel plates —generally glass plates. After the polymerization, the polymer sheets obtained are foamed in a further, separate method step.

The method relevant in production technology is based on foaming in a hot-air oven, which is to be referred to below as the hot-air method. The polymer sheets are introduced suspended in a forced-circulation oven, transported through said oven by a self-sustaining traction system and discharged at the end as foam sheets. The distance covered by the sheets in the oven is referred to below as L. The foaming time is thus defined by the length L of the oven and the constant travelling velocity V of the transport system in the total oven. The oven throughput depends not only on its length L and the travelling velocity V of the transport system but also on the time interval t and hence also the geometric spacing a of the sheets with which the latter are introduced into the oven. Since the sheets are greatly distorted during the foaming method, the spacing a must be larger than $b/\pi$ so that the sheets cannot touch one another during the foaming and thus become damaged. b is defined as the length of the side from which the sheet is suspended and which the sheet has when it has been foamed. The content of this publication is limited to the method step comprising foaming.

DE 3 630 960 describes a further method for the foaming of the abovementioned copolymer sheets from methacrylic acid and methacrylonitrile. Here, the sheets are foamed with the aid of a microwave field, and this is therefore referred to below as the microwave method. It must be ensured here that the sheet to be foamed or at least its surface must be heated beforehand up to or above the softening point of the material. Since of course the foaming of the material softened by the external heating also begins under these conditions, the foaming method alone cannot be controlled by the influence of a microwave field but also must be controlled from the outside by accompanying heating. Thus, a microwave field is coupled with the usual one-stage hot-air method in order to accelerate the foaming. However, the microwave method has proved too complicated and therefore not relevant in practice and is not used today.

WO 90/2621 describes a foam obtained from methacrylic acid and methacrylonitrile, acrylamide as a comonomer preventing premature formation of precipitates during the polymerization. The foam formed is very uniform and the product has no internal stresses.

DE 197 17 483 describes a method for the preparation of polymethacrylimide foams to which 1–5% by weight, based on the monomer mixture, of MgO are added. Foams having substantially improved thermomechanical properties are obtained.

DE 196 06 530 describes the addition of a flameproofing agent by means of polymethacrylimide foams.

OBJECT

In order to make ROHACELL more attractive for existing applications, it is necessary to optimize its material properties. Heat of reaction evolved during the foaming leads to a temperature gradient in the foamed sheet and therefore also to a location-dependent density in the sheet. As a result of this, the mechanical characteristics of a foam sheet likewise depend on the sampling location, since the density is known to have a considerable effect on mechanical properties, such as, for example, compressive strength or creep behaviour. The heat of reaction evolved can lead to cracking and hence to the destruction of the material in the production of low densities. It has now been found that the abovementioned disadvantages can be avoided by the method found. For this purpose, a more efficient preparation is to be ensured by an associated increase in the throughput.

ACHIEVEMENT

Surprisingly, the object described above can be achieved by dividing the hot-air method into two separate hot-air processes. Instead of two hot-air processes, it is also possible to combine three or more processes. In the first hot-air process, the sheet to be foamed is preheated in a hot-air oven below the actual foaming temperature of the material. The linear regression of the temperature increase as a function of time gives a mean linear heating rate of 0.001–10 K/min, preferably 0.01–5 K/min and particularly preferably 0.1–1 K/min.

The linear regression of the temperature increase is also referred to as the temperature ramp. The hot sheet is transported from the preheating oven into the actual foaming hot-air oven. The foaming hot-air oven has the temperature required for foaming, which is above the preheating temperature. The foaming hot-air oven can also consist of a second oven part of the preheating oven. The temperature profile to which the sheet is subjected during the foaming is represented by the grey line in FIG. 1. The high viscosity in the low temperature range of the preheating inevitably results in a supersaturated solution of the blowing gas in the polymer. The evolved heat of reaction, which is usually troublesome during the foaming, is uniformly distributed in the polymer sheet on preheating. Only when the material is heated to the foaming temperature does phase separation of polymer matrix and blowing agent occur and lead to expansion of the polymer sheet.

BRIEF DESCRIPTION OF THE FIGURE

The preheating can be carried out here in the form of a temperature ramp or of a constant preheating temperature.

Figure 1:
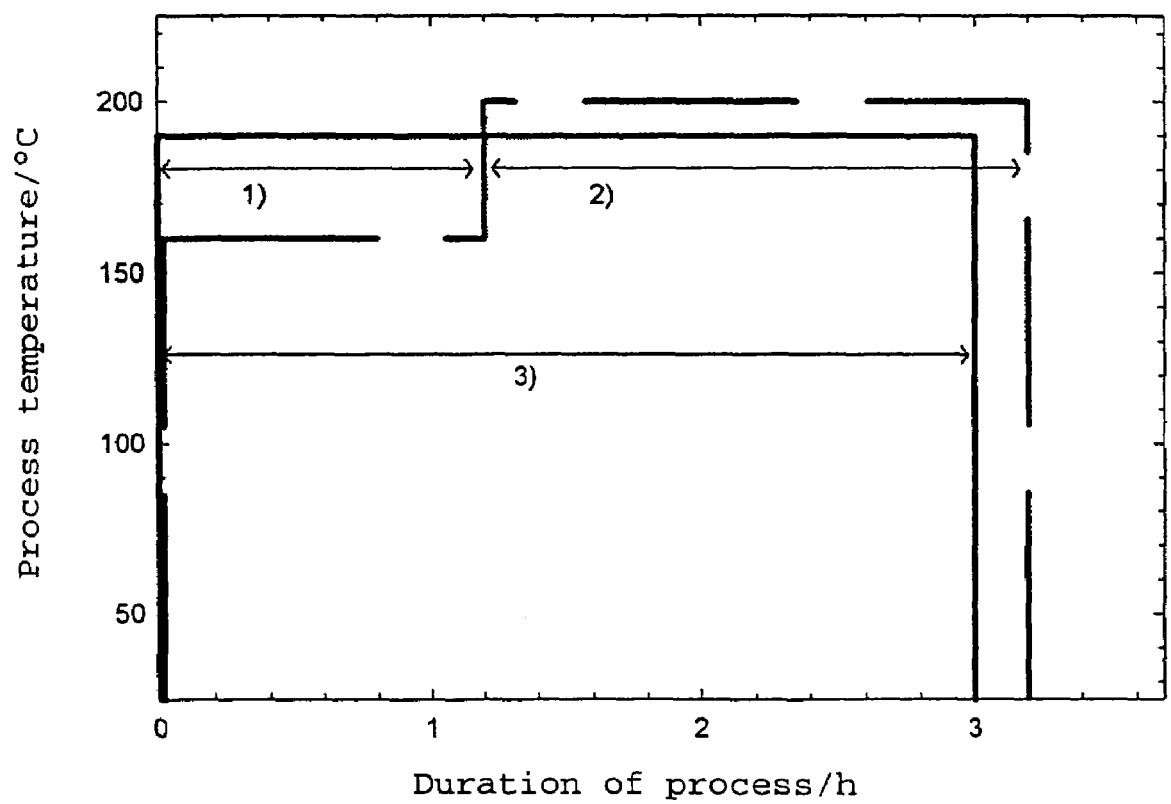
FIG. 1 shows the difference between the method to date (black line, one-stage hot-air method) and the novel method (broken line, two-stage hot-air method) by way of example for the case of a constant preheating temperature.

Advantages of the method according to the invention:

In the case of certain formulations, PMI foams have poor creep behaviour if they are foamed in a one-stage method step. This makes processing of such foams as core material possible only to a limited extent. With the aid of the two-stage hot-air method, the compression according to DIN 53425 (ASTMD621) can be reduced to ⅒.

Furthermore, cracking can occur in foam slabs in the case of certain formulations when the one-stage hot-air method is used for the production of low densities, which leads to waste. Foam slabs which have cracks owing to imperfect foaming and therefore cannot be used for applications are to be regarded as waste here. Cracks must not occur. Thus, for example, 40% waste means that 40 out of 100 foam slabs produced have to be removed and disposed of owing to imperfect foaming and/or cracking. With the aid of the two-stage hot-air method, the waste can be more than halved.

Because the actual foaming time can be reduced by upstream preheating, the travelling velocity V of the transport system in the oven can be increased in the case of a two-stage hot-air method, which causes the throughput to increase. FIG. 1 shows, by way of example, this reduction in the foaming time by the preheating of the polymers, without restricting this effect to the parameters shown there: the foaming time is reduced to ⅔ of the original foaming time in this example.

If the uniformly preheated polymer sheet is further heated to the foaming temperature, no temperature gradient is caused in the sheet by an exothermic reaction and furthermore the temperature gradient due to the temperature jump to the foaming temperature is itself smaller. The larger this temperature jump which the polymer sheet experiences on entering the foaming process, the greater is the temperature gradient caused thereby and produced in the sheet.

It is obvious that stress differences and blowing agent pressure differences occur in the material, firstly owing to the thermal expansion and secondly owing to the staggered start of foaming, which is location-dependent because of the temperature gradient. In the example shown in FIG. 1, the temperature jump experienced by the polymer sheet on entering the foaming process is 175 K for the case of the one-stage hot-air method (black line) and only 40 K for the case of the two-stage hot-air method (grey line).

By means of a suitable (temperature ramp), it is also possible entirely to avoid a temperature jump. This finally has a major consequence for the homogeneity of the foam sheet: the initially described distortion of the sheets can be suppressed so that the condition a>b/π no longer need be maintained. This shortens the cycle time t introduced at the outset and, owing to the increase in the throughput, also has an ecological benefit in addition to the increased net product with the same oven design.

EXAMPLES

Comparative Example 1

330 g of isopropanol and 100 g of formamide were added as blowing agent to a mixture of 5 700 g of methacrylic acid, 4 380 g of methacrylonitrile and 31 g of allyl methacrylate. Furthermore, 4 g of tert-butyl perpivalate, 3.2 g of tert-butyl per-2-ethylhexanoate, 10 g of tert-butyl perbenzoate, 10.3 g of cumyl perneodecanoate, 22 g of magnesium oxide, 15 g of blowing agent (PAT 1037) and 0.07 g of hydroquinone were added to the mixture.

This mixture was polymerized for 68 h at 40° C. and in a chamber formed from two glass plates measuring 50×50 cm and having an 18.5 mm thick edge seal. The polymer was then subjected to a heating programme ranging from 32° C. to 115° C. for 32 h for the final polymerization.

The subsequent foaming in the hot-air method was carried out for 2 h 25 min at 205° C., considerable distortion of the sheet being observable during the foaming. In the incompletely foamed state, the sheet curved at one point to such an extent that the two opposite sides which are perpendicular to the suspension side touched at one point. The foam thus obtained had a density of 235 kg/m$^3$. The compression according to DIN 53425 (ASTM D621) was more than 18% at 180° C. and a load of 0.35 MPa after 2 h.

Example 1

The procedure was as described in comparative example 1. However, the hot-air method used was in two stages: preheating was effected for 2 h at 140° C. and then foaming for 2 h 75 min at 205° C. Only negligible distortion of the foamed sheet was observed. The foam thus obtained had a density of 238 kg/m$^3$. The compression according to DIN 53425 (ASTM D621) was 12.7% at 180° C. and a load of 0.35 MPa after 2 h.

Example 2

The procedure was as described in comparative example 1. However, the hot-air method used was in two stages: preheating was effected for 2 h at 150° C. and then foaming for 2 h 25 min at 210° C. Only negligible distortion was observed, which was less than in Example 1.

The foam thus obtained had a density of 203 kg/m$^3$. The compression according to DIN 53425 (ASTM D621) was 4.6% at 180° C. and a load of 0.35 MPa after 2 h.

Example 3

The procedure was as described in comparative example 1. However, the hot-air method used was in two stages: preheating was effected for 2 h at 160° C. and then foaming for 2 h 25 min at 215° C. Only negligible distortion was observed, which was less than in example 2. The foam thus obtained had a density of 208 kg/m$^3$. The compression according to DIN 53425 (ASTM D621) was 2.9% at 180° C. and a load of 0.35 MPa after 2 h.

Example 4

The procedure was as described in comparative example 1. However, the hot-air method used was in two stages: preheating was effected for 2 h at 160° C. and then foaming for 2 h 25 min at 220° C. Only negligible distortion was observed, which was similar to that in example 3. The foam thus obtained had a density of 168 kg/m$^3$. The compression according to DIN 53425 (ASTM D621) was 1.3% at 180° C. and a load of 0.35 MPa after 2 h.

Example 5

The procedure was as described in comparative example 1. However, the hot-air method used was in two stages: preheating was effected for 2 h at 170° C. and then foaming for 2 h 25 min at 215° C. No distortion was observed. The foam thus obtained had a density of 199 kg/m³. The compression according to DIN 53425 (ASTM D621) was 3.5% at 180° C. and a load of 0.35 MPa after 2 h.

Example 6

The procedure was as described in comparative example 1. However, the hot-air method used was in two stages: preheating was effected for 1 h 25 min at 180° C. and then foaming for 2 h 25 min at 210° C. No distortion was observed. The foam thus obtained had a density of 218 kg/m³. The compression according to DIN 53425 (ASTM D621) was 1.6% at 180° C. and a load of 0.35 MPa after 2 h.

Comparative example 1 and examples 1 to 6 clearly show that the creep behaviour is improved by the preheating. In spite of lower densities, a lower compression is observed under identical measuring conditions. On the other hand, it is known to a person skilled in the art that a reduction in the density of a rigid foam results in a deterioration in its mechanical properties, i.e. its creep modulus becomes smaller and hence the compression greater under identical measuring conditions.

Comparative Example 2

42 kg of isopropanol and 47 kg of formamide were added as blowing agent to a mixture of 610 kg of methacrylic acid and 390 kg of methacrylonitrile. Furthermore, 0.4 kg of tert-butyl perpivalate, 0.4 kg of tert-butyl per-2-ethylhexanoate, 0.7 kg of tert-butyl perbenzoate, 1.03 kg of cumyl perneodecanoate, 2.2 kg of zinc oxide, 1.5 kg of blowing agent (PAT 1037) and 0.075 kg of hydroquinone were added to the mixture.

This mixture was polymerized for 116 h at 33° C. in chambers which were formed from two glass plates measuring 100×200 cm and having a 30 mm thick edge seal. The polymer was then subjected to a heating programme ranging from 35° C. to 130° C. for 40 h for the final polymerization.

The subsequent foaming in the hot-air method was effected for 2 h 30 min at 200° C., considerable distortion of the sheets being observable during the foaming. The foam thus obtained had a density of 31 kg/m³. However, 40% of the foam thus prepared had to be discarded as waste, owing to cracking.

Example 7

The procedure was as described in comparative example 2. However, the hot-air method used was in two stages: preheating was effected for 1.5 h at 160° C. and then foaming for 2 min 30 min at 205° C. No distortion of the sheets was observed during the foaming. The foam thus obtained had a density of 32 kg/m³. Cracking and the associated material loss due to waste could be reduced to 5%.

The invention claimed is:

1. A method for production of polymethylacrylimide foamed materials in the form of blocks or plates, comprising:
copolymerizing methacrylic acid and methacrylonitrile and optionally a copolymerizable monomer and additive in the presence of a radical-forming initiator, thereby obtaining a copolymer;
postpolymerizing and cyclizing said copolymer to said polymethylacrylimide, and
transforming said polymethylacrylimide to a foamed material, in a two-stage process step,
wherein
a first stage of said two-stage process step comprises preheating of the polymethylacrylimide to be foamed in a first hot-air oven or hot air oven section at a heating rate used to raise the temperature of between 0.001 K/min and 10 K/min,
while foaming of the preheated polymethylacrylimide takes place in a second stage of said two-stage process, in a second hot-air oven or hot-air ovens or hot air oven section.

2. The method according to claim 1, in which the two hot-air ovens or hot-air oven sections used for the two-stage process have different temperatures.

3. The method according to claim 1, in which the temperature of the hot-air oven used for preheating is lower, while being constant in time, than that of the hot-air oven or hot-air oven section used for foaming.

4. The method according to claim 1, in which the temperature of the hot-air oven used for preheating is lower, while rising over the course of time, than that of the hot-air oven or hot-air oven section used for foaming, and wherein the temperature in the hot-air oven used for preheating can once again be equal, at the end of the heating cycle, to the temperature in the hot-air oven or hot-air oven section used for foaming.

5. The method according to claim 1, in which the heating rate used to raise the temperature is between 0.01 K/min and 5 K/min.

6. The method according to claim 1, in which the heating rate used to raise the temperature is between 0.1 K/min and 1 K/min.

7. The method according to claim 6, in which different heating rates in combination with one another can be used for the average linear temperature rise.

8. The method according to claim 6, in which the final temperature of the temperature rise can be higher than the temperature that is needed for foaming and that exists in the hot-air oven used for foaming.

9. The method according to claim 1, wherein said copolymerizable monomer is present.

10. The method according to claim 1, wherein said additive is present.

11. The method according to claim 1, wherein said first stage of said two-stage process step is performed in at least one hot air oven.

12. The method according to claim 1, wherein said first stage of said two-stage process step is performed in at least one hot air oven section.

13. The method according to claim 1, wherein said second stage of said two-stage process step is performed in at least one hot air oven.

14. The method according to claim 1, wherein said second stage of said two-stage process step is performed in at least one hot air oven section.

* * * * *